United States Patent Office 3,641,123
Patented Feb. 8, 1972

---

3,641,123
SUBSTITUTED AMIDES OF 4-ARYL-3-HYDROXY BUTYRIC ACIDS
David Frank Hayman and Anthony Musgrave Wild, London, England, assignors B.D.H. Chemicals Limited
No Drawing. Filed Nov. 15, 1968, Ser. No. 776,264
Claims priority, application Great Britain, Nov. 15, 1967, 51,987/67
Int. Cl. C07c *103/30;* A61k *27/00*
U.S. Cl. 260—500.5 H   1 Claim

ABSTRACT OF THE DISCLOSURE

Substituted amides of 4-aryl-3-hydroxybutyric acids having utility as anti-inflammatory agents are provided. The amides are prepared by reacting a lower alkyl ester of a 4-aryl-3-hydroxybutyric acid with an excess of an appropriate amine. In the case of hydroxamic acids the product is isolated as a potassium or sodium salt which is converted into the free hydroxamic acid by acidification.

---

This invention relates to organic compounds and has particular reference to substituted amides of 4-aryl-3-hydroxybutyric acids.

We have made the unexpected discovery that these substituted amides are active in the rat-paw carrageenin assay and in the standard guinea pig UV erythema assay. For example the compound 4-(p-biphenylyl)-3-hydroxybutyrohydroxamic acid (Formula I below; R=p-phenyl, $R^1$=H, $R^2$=OH) described in Examples 1 and 2 was found to be seventeen times as active as phenylbutazone in the Ultraviolet erythema test and is consequently a highly active anti-inflammatory agent.

The new compounds of the present invention are useful as anti-inflammatory agents in the general manner as the known anti-inflammatory agent phenylbutazone mentioned above as a standard for comparison.

It is an object of this invention to provide new substituted amides of 4-aryl-3-hydroxybutyric acids having the general Formula I below where R, $R^1$ and $R^2$ are as hereinunder defined.

It is another object of the present invention to provide a process for the preparation of substituted amides of 4-aryl-3-hydroxybutyric acids having the general Formula I below.

It will be obvious to those skilled in the art that the compounds of the present invention can exist in optically active forms. The invention covers the optically active forms as well as racemic mixtures.

It is yet another object of this invention to provide pharmaceutical and veterinary compositions of the anti-inflammatory products of the present invention comprising a substituted amide of a 4-aryl-3-hydroxybutric acid having the general Formula I below in admixture with one or more solid or liquid pharmaceutically acceptable inert carriers.

According to the present invention there is provided a process for the preparation of a substituted amide of a 4-aryl-3-hydroxybutyric acid having the general formula

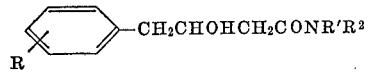
(I)

where R is a phenyl group or an alkyl group containing 1 to 4 carbon atoms, R' is hydrogen or a lower alkyl group containing from 1 to 4 carbon atoms, $R^2$ is hydroxyl or lower alkyl containing 1 to 4 carbon atoms or an aralkyl group (e.g. benzyl or phenethyl) or a cycloalkyl group containing 5 to 8 carbon atoms or alternatively the group $NR'R^2$ may represent a heterocyclic radical (for example, piperidino, 1,2,3,6-tetrahydropyridino or morpholino) which process comprises reacting a lower alkyl ester of a 4-aryl-3-hydroxybutyric acid having the general formula

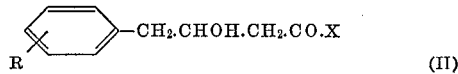
(II)

where R has the same meaning as above and X is a lower alkoxy group containing up to 6 carbon atoms with an excess of the appropriate amine.

Thus the compounds are prepared by reaction of a lower ester, for example, the methyl or ethyl ester of a 4-aryl-3-hydroxybutyric acid (described in our British specification No. 1,040,735) with an excess of the appropriate amine the mixture being heated as necessary. If required the reaction may be carried out in a suitable solvent, for example, methanol, ethanol or n-butanol. When the reaction is complete the excess of amine is then removed from the mixture by heating, if necessary, at reduced pressure when the residual solid is crystallised from a suitable solvent, for example, methanol, ethanol, aqueous methanol, ethyl acetate, benzene or toluene to yield the product as a stable crystalline solid.

In the case of the hydroxamic acids (I; R'=H, $$R^2=OH)$$

it is found most convenient to isolate the product as a sodium or potassium salt which is converted into the free hydroxamic acid by acidification with, for example, acetic acid.

Thus a solution of hydroxylamine hydrochloride in methanol may be treated with a solution of potassium hydroxide in methanol, the precipitated potassium chloride filtered off and the filtrate treated with a solution of the methyl or ethyl ester of a 4-aryl-3-hydroxybutyric acid to form the potassium salt of the hydroxamic acid.

Following is a description by way of example of methods of carrying the invention into effect.

EXAMPLE 1

4-(p-biphenylyl)-3-hydroxybutyrohydroxamic acid (a) Ethyl-4-(p-biphenylyl)-3-hydroxybutyrate.—A solution of 4-(p-biphenylyl)-3-hydroxybutyronitrile (23.7 g.) in ethanol (120 ml.) containing water (1.8 ml.) was treated with hydrogen chloride gas (24 g.). The mixture was allowed to stand at room temperature for 1 hour and was then boiled under reflux for 4 hours. The mixture was cooled, diluted with water (500 ml.) and the oil extracted with 1,2-dichloroethane. The dichloroethane extract was washed acid-free with water, dried with anhydrous sodium sulphate and the solvent distilled off first at atmospheric pressure and then at reduced pressure. The residual ester was purified by distillation at reduced pressure and had B.P. 184° C. at 0.1 mm.

4-(p-biphenylyl)-3-hydroxybutyrohydroxamic acid (b) A solution of hydroxylamine hydrochloride (21 g.) in methanol (150 ml.) was treated with a solution of 85% potassium hydroxide (28 g.) in methanol (100 ml.). The precipitated potassium chloride was filtered off and the filtrate was stirred and treated with a solution of ethyl-4-(p-biphenylyl) - 3 - hydroxybutyrate (28.4 g.) in methanol (150 ml.). The reaction mixture was cooled to room temperature and allowed to stand overnight. The precipitated potassium salt of the hydroxamic acid was collected and air-dried. (Yield=18.2 g.). The potassium salt was dissolved in a small volume of warm glacial acetic acid and the solution diluted with water. The precipitated hydroxamic acid was collected and dried. (Yield 14.4 g.). It had M.P. 172–174° C. after crystallization from ethyl acetate.

EXAMPLE 2

4-(p-biphenylyl)-3-hydroxybutyrohydroxamic acid

A solution of hydroxylamine hydrochloride (21 g.) in methanol (125 ml.) was treated with a solution of 85% potassium hydroxide (28 g.) in methanol (100 ml.) and the precipitated potassium chloride was filtered off. The filtrate was treated with a solution of methyl-4-(p-biphenylyl)-3-hydroxybutyrate (27.0 g.) in methanol (125 ml.) and the mixture was kept at room temperature for 20 hours. The potassium salt of the hydroxamic acid which had separated was collected and dried at room temperature. (Yield 18.5 g.). It was dissolved in a small volume of warm glacial acetic acid and the solution diluted with water and cooled to below 10° C. The precipitated hydroxamic acid was collected and dried. (Yield 14.6 g.). It had M.P. 172–174° C. (crystallisation from ethyl acetate) and was identical with the product described in Example 1.

EXAMPLE 3

3-hydroxy-4-o-tolylbutyrohydroxamic acid (a) Methyl - 3 - hydroxy - 4-o-tolylbutyrate.—A solution of 3-hydroxy-4-o-tolylbutyronitrile (29 g.) in methanol (120 ml.), was saturated with hydrogen chloride, allowed to stand for 1 hour and then heated under reflux for 2 hours. It was then cooled, diluted with water and the oil isolated with chloroform. The chloroformic extract was concentrated to yield the ester (24.1 g.), B.P. 98–100° C. at 0.1 mm.

3-hydroxy-4-o-tolylbutyrohydroxamic acid (b) A solution of hydroxylamine hydrochloride (7 g.) in methanol (100 ml.) was treated with a solution of 85% potassium hydroxide (11 g.) in methanol (40 ml.). The precipitated potassium chloride was filtered off and methyl-3-hydroxy-4-o-tolylbutyrate (10.4 g.) was stirred into the filtrate and the resultant solution allowed to stand at room temperature for 48 hours. The methanol was distilled off at reduced pressure yielding the crude crystalline potassium salt which was dissolved in a small volume of water and acidified with acetic acid. The mixture was cooled below 10° C. and the solid collected, washed with cold water and crystallised from ethyl acetate to yield the hydroxamic acid (7 g.), M.P. 150–152° C.

EXAMPLE 4

3-hydroxy-4-o-tolylbutyrohydroxamic acid

The foregoing reaction in Example 3(b) was repeated using ethyl-3-hydroxy-4-o-tolylbutyrate (11.0 g.) in place of methyl - 3-hydroxy-4-o-tolylbutyrate. The hydroxamic acid, isolated in exactly the same way as described in Example 3(b) had M.P. 150–152° C. (Yield 8.2 g.).

EXAMPLE 5

4-[4-(p-biphenylyl)-3-hydroxybutyryl]-morpholine

A mixture of methyl - 4 - (p-biphenylyl)-3-hydroxybutyrate (10.8 g.) and morpholine (10 ml.) was heated on the steam bath for 120 hours. The excess of morpholine was distilled off at 1 mm. pressure and the viscous residue was dissolved by warming in a solution of potassium hydroxide (1.12 g.) in water (75 ml.) to hydrolyse unchanged methyl ester. The solution was cooled to 0° C. overnight when the crystalline amide separated. This was collected and crystallised from a mixture of acetone and light-petroleum (B.P. 60–80° C.) and then from aqueous ethanol to yield the pure morpholine amide (7.33 g.) M.P. 99.5–101.5° C.

EXAMPLE 6

4-(p-biphenylyl)-3-hydroxy-N-methylbutyramide

A solution of methyl - 4 - (p-biphenylyl)-3-hydroxybutyrate (5.4 g.) in 30% ethanolic methylamine (50 ml.) was allowed to stand at room temperature for 70 hours. The excess of ethanol and methylamine were then distilled off at reduced pressure leaving the solid methylamide which had M.P. 117–119° C. after crystallisation from a mixture of benzene and toluene. (Yield 78%).

EXAMPLE 7

4-(p-biphenylyl)-N-ethyl-3-hydroxybutyramide

The reaction described in Example 6 was repeated using 30% ethanolic ethylamine solution in place of 30% ethanolic methylamine solution. The ethylamide, isolated in the same manner, was crystallised from benzene to give the product in 62% yield, M.P. 126–128° C.

EXAMPLE 8

4-(p-biphenylyl)-N-cyclohexyl-3-hydroxybutyramide

A solution of methyl - 4 - (p-biphenylyl)-3 - hydroxybutyrate (5.4 g.) in cyclohexylamine (10 g.) was heated at 100° C. for 12 hours then excess of cyclohexylamine was distilled off at reduced pressure (20 mm.). The residual solid was crystallised from a mixture of benzene and light-petroleum (B.P. 60–80° C.) to yield the cyclohexylamide (4.5 g.) which had M.P. 153–155° C. after crystallisation from aqueous methanol.

EXAMPLE 9

White scored tablets each containing 30 mg. of 4-(p-biphenylyl)-3-hydroxybutyrohydroxamic acid

|  | Mg. |
|---|---|
| 4-(p-biphenylyl)-3-hydroxybutyrohydroxamic acid | 194.4 |
| Lactose | 133 |
| Starch | 19.4 |
| Starch paste | (1) |
| Magnesium stearate | 1.9 |
| Starch, sufficient to make 194.4 mg. | |

[1] A sufficient quantity.

The first three ingredients were thoroughly mixed together, dry, and the mixture granulated with a suitable amount of the 15% starch paste. The resultant granule was tray-dried at 50° C., processed through a No. 20 mesh sieve and the lubricant (magnesium stearate) added, together with sufficient starch to produce the required weight. After thorough mixing, tablets each weighing 194.4 mg. were compressed from the mixture, using punches of convenient diameter and suitably embossed to provide a break-line on one surface.

EXAMPLE 10

N-benzyl-4-(p-biphenylyl)-3-hydroxybutyramide

A solution of methyl-4-(p-phenylyl)-3-hydroxybutyrate (5.4 g.) in benzylamine (10 g.) was heated at 100° C. for 20 hours then excess of benzylamine was distilled off at reduced pressure (5 mm.). The residual solid was crystallised from a mixture of toluene and light-petroleum (B.P. 40–60° C.) to yield the benzylamine (5.2 g.), M.P. 147–149° C.

We claim:
1. 4-(p-biphenylyl)-3-hydroxybutyrohydroxamic acid.

References Cited

UNITED STATES PATENTS

| | | | |
|---|---|---|---|
| 2,279,560 | 4/1942 | Dietrich | 260—500.5 H |
| 2,279,973 | 4/1942 | Dietrich | 260—500.5 H |
| 2,346,665 | 4/1944 | Cupery | 260—500.5 H |
| 2,397,508 | 4/1946 | Rouault et al. | 260—500.5 H |
| 2,772,281 | 11/1956 | Holly et al. | 260—500.5 H |
| 3,479,396 | 11/1969 | Buu-Hoi et al. | 260—500.5 H |

FOREIGN PATENTS 187,007   11/1966   U.S.S.R. _____ 260—500.5 H

OTHER REFERENCES

Goldenberg, "Dissertation Abstracts," vol. 17, (August 1957), p. 1214, As 30.M5.

BERNARD HELFIN, Primary Examiner

J. E. EVANS, Assistant Examiner

U.S. Cl. X.R.

260—247.7 T, 290 H, 294.7 R, 473 A, 595 P; 424—315